United States Patent
LeBlanc et al.

(10) Patent No.: US 10,255,702 B2
(45) Date of Patent: Apr. 9, 2019

(54) DYNAMIC PROGRESSIVE AWARENESS

(71) Applicant: Lin and Associates, Inc., Phoenix, AZ (US)

(72) Inventors: Eric F. LeBlanc, Phoenix, AZ (US); Hieu T. Nguyen, Tempe, AZ (US)

(73) Assignee: Lin and Associates, Inc., Phoenix, AZ (US)

(*) Notice: Subject to any disclaimer, the term of this patent is extended or adjusted under 35 U.S.C. 154(b) by 0 days.

(21) Appl. No.: 15/915,709

(22) Filed: Mar. 8, 2018

(65) Prior Publication Data
US 2018/0197319 A1 Jul. 12, 2018

Related U.S. Application Data

(63) Continuation-in-part of application No. PCT/US2017/033738, filed on May 22, 2017.
(Continued)

(51) Int. Cl.
*G06T 11/00* (2006.01)
*G06T 11/20* (2006.01)
(Continued)

(52) U.S. Cl.
CPC .......... *G06T 11/206* (2013.01); *G01M 13/00* (2013.01); *G05B 23/0272* (2013.01); *G06F 3/147* (2013.01); *G06T 11/001* (2013.01)

(58) Field of Classification Search
CPC .... G06T 11/206; G06T 11/001; G01M 13/00; G06F 3/147; G05B 23/0272
(Continued)

(56) References Cited

U.S. PATENT DOCUMENTS 6,587,108 B1 7/2003 Guerlain
6,704,012 B1* 3/2004 Lefave ............... G06F 11/323
345/440
(Continued)

FOREIGN PATENT DOCUMENTS

WO 2017035377 3/2017

OTHER PUBLICATIONS

Publication WO2017205238 and ISR for PCT/US2017/033738 (OEE Work Product; Parent of Current Application).
(Continued)

*Primary Examiner* — Chante E Harrison
(74) *Attorney, Agent, or Firm* — Allan Watts

(57) ABSTRACT

Behavior of an industrial system is communicated to an operator through graphical representations of gauges having a scale and pointer that represent parameters of the system. The pointer is positioned relative to the scale to indicate the parameter value. In various embodiments, when the parameter value is within operating limits, a first range is displayed that corresponds to the operating limits. When the parameter value has gone outside of the operating limits, the displayed range is changed, in some embodiments, to a second range that goes beyond the operating limits. A local visual indicator is also displayed, in particular embodiments, when the parameter value has gone outside of the operating limits. In a number of embodiments, such a tool can help to make the operator better aware of abnormal parameters of the system for early detection and correction of problematic operating conditions.

17 Claims, 3 Drawing Sheets

Related U.S. Application Data

(60) Provisional application No. 62/340,210, filed on May 23, 2016.

(51) Int. Cl.
  *G05B 23/02* (2006.01)
  *G06F 3/147* (2006.01)
  *G01M 13/00* (2006.01)

(58) Field of Classification Search
  USPC ................................................ 345/440, 441
  See application file for complete search history.

(56) References Cited

U.S. PATENT DOCUMENTS

| | | |
|---|---|---|
| 9,495,276 B1 | 11/2016 | Friedman |
| 9,665,956 B2 | 5/2017 | Shikhman |
| 9,672,745 B2 | 6/2017 | Kneuper |
| 9,753,639 B2 | 9/2017 | Cieplinski |
| 2007/0005266 A1 | 1/2007 | Blevins |
| 2007/0061786 A1 | 3/2007 | Zhou |
| 2007/0106761 A1 | 5/2007 | Beoughter |
| 2007/0130572 A1 | 6/2007 | Gilbert |
| 2007/0132779 A1 | 6/2007 | Gilbert |
| 2007/0139441 A1 | 6/2007 | Lucas |
| 2007/0150081 A1 | 6/2007 | Nixon |
| 2007/0168060 A1 | 7/2007 | Nixon |
| 2007/0168065 A1 | 7/2007 | Nixon |
| 2007/0174225 A1 | 7/2007 | Blevins |
| 2007/0179641 A1 | 8/2007 | Lucas |
| 2007/0211079 A1 | 9/2007 | Nixon |
| 2008/0066004 A1 | 3/2008 | Blevins |
| 2008/0077257 A1 | 3/2008 | Exxon |
| 2008/0229226 A1 | 9/2008 | Rowbottom |
| 2008/0300698 A1 | 12/2008 | Havekost |
| 2009/0149981 A1 | 6/2009 | Evans |
| 2009/0306837 A1* | 12/2009 | Ausman ............... G01D 7/00 701/3 |
| 2010/0188410 A1 | 7/2010 | Gilbert |
| 2011/0001636 A1 | 1/2011 | Hedrick |
| 2012/0179319 A1 | 7/2012 | Gilman |
| 2013/0106864 A1* | 5/2013 | Boyer ............... G06T 11/206 345/440.2 |
| 2014/0046458 A1 | 2/2014 | Timsjo |
| 2014/0277619 A1* | 9/2014 | Nixon ............... G05B 15/02 700/83 |
| 2014/0277620 A1* | 9/2014 | Nixon ............. G05B 23/0216 700/83 |
| 2014/0344007 A1 | 11/2014 | Shende et al. |
| 2015/0035834 A1* | 2/2015 | Axness ............... G01D 1/12 345/440 |
| 2015/0106753 A1* | 4/2015 | Tran ............... G05B 23/0272 715/765 |
| 2015/0138205 A1* | 5/2015 | Rajagopalan ........... A61B 5/742 345/440 |
| 2015/0213246 A1 | 7/2015 | Turgeman et al. |
| 2016/0042541 A1* | 2/2016 | Nixon ............. G05B 23/0216 715/771 |
| 2017/0042488 A1* | 2/2017 | Muhsin ............... A61B 5/742 |
| 2017/0132704 A1* | 5/2017 | Mauro, Jr. ............ G06Q 40/04 |
| 2018/0024901 A1* | 1/2018 | Tankersley ........ G06F 17/30525 707/694 |

OTHER PUBLICATIONS

ISR for PCT/US2016/048741 (History Compare, other application of same Applicant).

Written Opinion for PCT/US2017/033738 (OEE Work Product; Parent of Current Application).

\* cited by examiner

High Limits

Low Limits

Horizontal DPA

DPA Shape Alarming Breakdown

DYNAMIC PROGRESSIVE AWARENESS

RELATED PATENT APPLICATIONS

This patent application is a continuation-in-part of, and claims priority to, International Patent Application Serial Number PCT/US17/33738, filed on May 22, 2017, which claims priority to U.S. Provisional Patent Application Ser. No. 62/340,210, filed on May 23, 2016, and has the same title, inventors, and assignee. The contents of these priority patent applications are incorporated herein by reference.

FIELD THE INVENTION

Various embodiments of this invention relate to human machine interface (HMI) technology. Particular embodiments concern methods and software that communicate potentially abnormal behavior of an industrial system to an operator of the system. Certain embodiments concern selection and control of displayed ranges of graphical representations (e.g., of gauges) representing different parameters of the industrial system.

BACKGROUND OF THE INVENTION

In normal operation of an HMI technology, operators are consistently looking for any abnormal behavior or variable in the process. In many complex industrial processes, however, this is a very time-consuming task and is almost an impossibility without the aid from a tool to enable early detection in normal operations. Operators will typically scan the many numerical values on their screen(s) to get an idea of what is going on or perhaps what is about to happen in their process. In many cases, however, there are just too many variables to really make an assessment.

In the past, operators watched a number of gauges on one or more control boards that displayed real-time values of various parameters of the industrial system. Control panels have also been used with alarm lights that illuminated when alarm levels were reached. In some instances, colored lights were used to indicate alarm conditions. More recently, one or more computer screens have been used to display real-time values of parameters to operators. Various graphics have been used to display information on computer screens, including visual representations of gauges. Such gauges have included a scale and a pointer. Trade-offs have existed, however, regarding the displayed range to use for the scale. If a wide range was used, operators found it difficult to see small changes within the operating limits. If a narrow range was used, however, the scale would not show the real-time value when the real-time value was outside of the narrow range. Needs and/or potential for benefit exist for computer tools that communicate information about the operation of industrial systems to the operator more efficiently. Room for improvement exists over the prior art in these and other areas that may be apparent to a person of skill in the art having studied this document.

Summary of Particular Embodiments of the Invention

This invention provides, among other things, computerized methods of communicating behavior of an industrial system to an operator of the system. Various embodiments communicate, for example, potentially abnormal behavior of the system to the operator. Other embodiments include computer systems, computer programs, and computer-readable storage media that contain computer-readable instructions that communicate similar information. Many embodiments provide, as objects or benefits, computer tools that, in whole or in part, communicate information about the operation of industrial systems to the operator more efficiently. Certain embodiments display to the operator of the system graphical representations (e.g., of gauges) representing different parameters of the industrial system. Many embodiments change the displayed range of the parameter when the parameter value has gone outside of operating limits. Various embodiments also display a local visual indicator, for instance, that attracts the operator's attention to a parameter that gone outside of operating limits.

For example, specific computerized methods of communicating behavior of an industrial system to an operator of the system include acts of (e.g., using a computer, simultaneously, or both) displaying to the operator of the industrial system multiple graphical representations (e.g., of gauges) representing multiple different parameters of the industrial system. In many embodiments, each of the multiple different parameters is a quantitative parameter, each of the multiple graphical representations of the gauges represents a parameter value, each of the multiple graphical representations of the gauges comprises a scale representing a displayed range of the (e.g., quantitative) parameter, each of the multiple graphical representations of the gauges comprises a pointer (e.g., proximate the scale), or a combination thereof. Further, in various embodiments, (e.g., for each of the multiple graphical representations of the gauges) an act is performed of positioning the pointer (e.g., relative to the scale) to indicate the parameter value. In a number of such embodiments, (e.g., for each of the multiple graphical representations of the gauges) when the parameter value is within operating limits of the parameter, the displayed range of the parameter is a first range that corresponds to the operating limits. Still further, some such embodiments include (e.g., using the computer), for instance, for each of the multiple graphical representations of the gauges, changing the displayed range of the (e.g., quantitative) parameter from the first range to a second range that goes beyond the operating limits when the parameter value has gone outside of the operating limits. Even further, various embodiments include displaying to the operator of the industrial system a first local visual indicator, for example, when the parameter value has gone outside of the operating limits.

In some embodiments, the displaying to the operator of the industrial system the first local visual indicator includes changing a color, for example, of the scale. In addition, or instead, in some embodiments, the displaying to the operator of the industrial system the first local visual indicator includes adding a visual element, for example, to the scale. Further, in particular embodiments, the visual element is an outline, for instance, of the scale. Still further, in certain embodiments, the outline forms a border, for example, around one end of the scale. Still further, in some embodiments, the visual element is located at a first end of the scale when the parameter value exceeds the operating limits and the visual element is located at a second end of the scale when the parameter value is below the operating limits. Even further, in some embodiments, the second range has a first end and a second end, the first end is one of the operating limits, and the second end is an alarm value of the quantitative parameter, for example.

Moreover, some embodiments further include, (e.g., using the computer), for example, for a plurality of the multiple graphical representations of the gauges, changing the displayed range of the quantitative parameter from the second range to a third range that goes beyond the second range, for instance, when the parameter value has gone outside of the second range. In a number of such embodiments, for instance, the third range has a first end and a second end, the first end is an alarm value of the quantitative parameter, the second end is a high high alarm value or a low low alarm value of the quantitative parameter, or both, as examples. Further, various embodiments include (e.g., using the computer), for instance, for a plurality of the multiple graphical representations of the gauges, displaying to the operator of the industrial system a second local visual indicator, for example, when the parameter value has gone outside of the second range. Still further, in some embodiments, the displaying to the operator of the industrial system the second local visual indicator includes changing color, for example, of the scale.

Furthermore, some embodiments include (e.g., using the computer), for instance, for a plurality of the multiple graphical representations of the gauges, changing the displayed range of the quantitative parameter to a fourth range that goes beyond the third range, for example, when the parameter value is outside of the third range. In various embodiments, for example, the fourth range goes beyond the third range. In some embodiments, for instance, the fourth range has a first end and a second end and the first end is a high high alarm value or a low low alarm value of the quantitative parameter, as examples. Further still, in some embodiments (e.g., where the fourth range has a first end and a second end), the second end is a limit of instrument range for the quantitative parameter. Even further, in certain embodiments, the method further includes (e.g., using the computer), for instance, for a plurality of the multiple graphical representations of the gauges, displaying to the operator of the industrial system a third local visual indicator, for example, when the parameter value has gone outside of the third range.

In various embodiments, the displaying to the operator of the industrial system the multiple graphical representations of gauges representing multiple different parameters of the industrial system includes displaying the multiple graphical representations of gauges on a computer screen. Further, in many embodiments, the multiple graphical representations of gauges are displayed over a schematic diagram of the industrial system. Still further, various embodiments further include acts of simultaneously measuring the multiple different parameters of the industrial system, transmitting the multiple different parameters of the industrial system to the computer (e.g., for displaying to the operator of the system the multiple graphical representations of the gauges representing the multiple different parameters of the industrial system), correcting the potentially abnormal behavior of the industrial system, or a combination thereof.

Other embodiments include various other (e.g., computerized) methods of communicating potentially abnormal behavior of an industrial system to an operator of the industrial system. In some embodiments, for example, the method includes an act of (e.g., using a computer) simultaneously displaying to the operator of the industrial system multiple graphical representations representing multiple different parameters of the industrial system. In many embodiments, for example, each of the multiple different parameters is a quantitative parameter, each of the multiple graphical representations represents a parameter value, each of the multiple graphical representations includes a range representation of a displayed range of the quantitative parameter, each of the multiple graphical representations includes a pointer representation proximate the range representation, or a combination thereof. Further, numerous embodiments include (e.g., using the computer), for instance, for each of the multiple graphical representations, positioning the pointer representation relative to the range representation, for example, to indicate the parameter value. Still further, in many embodiments, (e.g., for each of the multiple graphical representations), when the parameter value is within operating limits, the displayed range of the quantitative parameter is a first range that corresponds to the operating limits. Even further, a number of embodiments include (e.g., using the computer), for example, for each of the multiple graphical representations, changing the displayed range of the quantitative parameter from the first range to a second range that goes beyond the operating limits, for instance, when the parameter value has gone outside of the operating limits. Even further still, some such embodiments include (e.g., using the computer), for instance, for each of the multiple graphical representations, displaying to the operator of the industrial system a first local visual indicator, for example, when the parameter value has gone outside of the operating limits.

Other specific embodiments include various computer systems, for example, that include computer-readable instructions which, when executed by the computer system, cause the computer system to perform certain acts. Such acts include, in some embodiments, for example, simultaneously display to an operator of an industrial system multiple graphical representations of gauges representing multiple different parameters of the industrial system. In a number of embodiments, for example, each of the multiple graphical representations of the gauges represents a parameter value, each of the multiple graphical representations of the gauges includes a scale representing a displayed range of the parameter, each of the multiple graphical representations of the gauges includes a pointer proximate the scale, or a combination thereof. In various embodiments, the instructions cause the computer system to, for example, for each of the multiple graphical representations of the gauges, position the pointer relative to the scale, for instance to indicate the parameter value. Further, in many embodiments, for example, for each of the multiple graphical representations of the gauges, when the parameter value is within operating limits, the displayed range of the parameter is a first range that corresponds to the operating limits. Still further, in various embodiments, for instance, for each of the multiple graphical representations of the gauges, the instructions cause the computer system to change the displayed range of the parameter from the first range to a second range that goes beyond the operating limits, for example, when the parameter value has gone outside of the operating limits. In many embodiments, (e.g., for each of the multiple graphical representations of the gauges), the instructions cause the computer system to display to the operator of the industrial system a first local visual indicator when the parameter value has gone outside of the operating limits.

Further, computer systems, computer programs, and computer-readable storage media can contain computer-readable instructions that, when executed by the computer, cause the computer to perform such or similar acts to the methods described herein. In addition, various other embodiments of the invention are also described herein, and other benefits of certain embodiments may be apparent to a person of skill in this area of technology. Various embodiments provide, for example, as an object or benefit, that they partially or fully address or satisfy one or more of the needs, potential areas for benefit, or opportunities for improvement described herein, or known in the art, as examples. Certain embodiments provide, for example, as objects or benefits, for instance, that they improve the awareness of operators of industrial systems of (e.g., real-time) values of various (e.g., quantitative) parameters of the industrial system, for example, relative to operating limits, alarm settings, or both.

Different embodiments simplify the evaluation of operating conditions, reduce operator time necessary to evaluate real-time parameters, increase communication efficiency from the industrial system to the operator, or a combination thereof, as examples. In certain embodiments, trade-offs are reduced or eliminated regarding the displayed range on graphical representations (e.g., of gauges). Particular embodiments allow operators to see small changes within the operating limits, while still allowing operators to see the parameter values (e.g., on the gauges) when the values are outside of the operating limits. In addition, in many embodiments, the attention of operators is drawn to parameters that are outside of operating limits or outside of alarm settings, which can help operators to focus their attention on the most important priorities. In many embodiments, computer tools are provided that communicate information about the operation of industrial systems to the operator more efficiently. Further, various embodiments include or provide for correcting potentially abnormal behavior of the industrial system.

Figure 1:
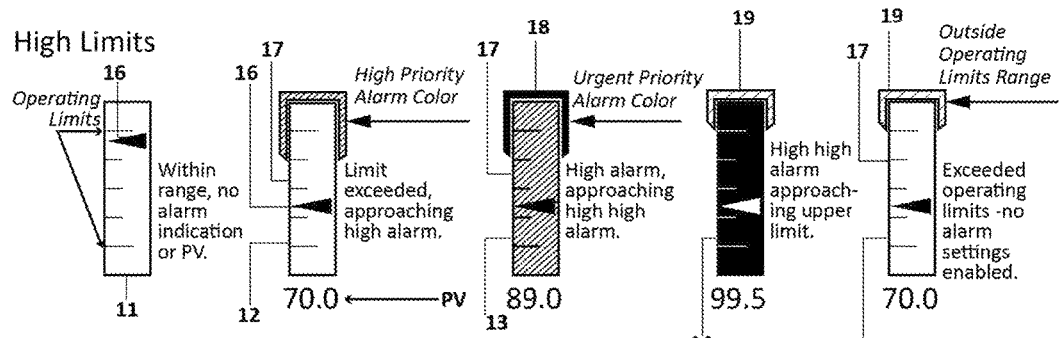
FIG. 1 is an example of a display (e.g., to an operator of an industrial system) of graphical representations of gauges representing one or more different parameters of the industrial system and illustrating high limits of the one or more different parameters.

The drawings provided herewith illustrate, among other things, examples of certain aspects of particular embodiments. Other embodiments may differ. Various embodiments may include aspects shown in the drawings, described in the specification (including the claims), known in the art, or a combination thereof, as examples.

DETAILED DESCRIPTION OF EXAMPLES OF EMBODIMENTS

Figure 5:
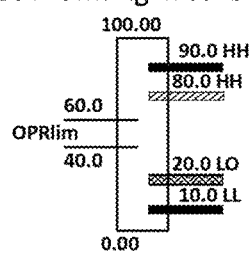
FIG. 5 is an example of a display (e.g., to an operator of an industrial system) of a graphical representation of a gauges representing one or more different parameters of the industrial system, wherein the graphical representation of the gauge is displayed vertically, and illustrating an example of operating limits and alarm values.
Figure 6:
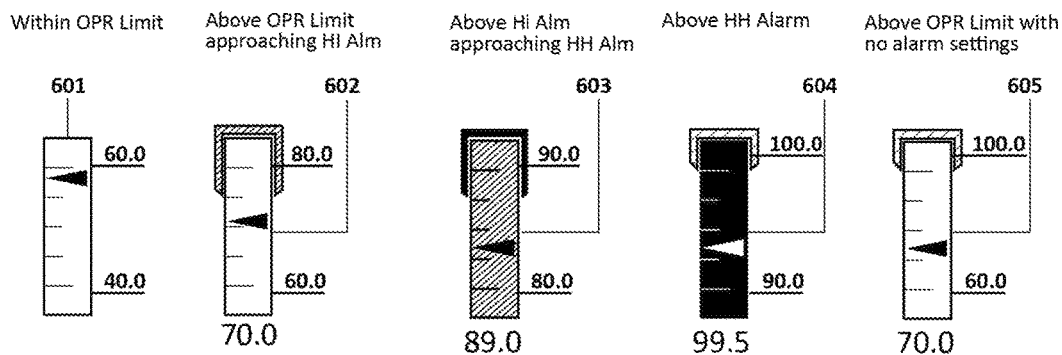
FIG. 6 is an example of a display (e.g., to an operator of an industrial system) of graphical representations of gauges representing one or more different parameters of the industrial system illustrating various values of the one or more different parameters relative to various operating and alarm values or settings.
Figure 6:
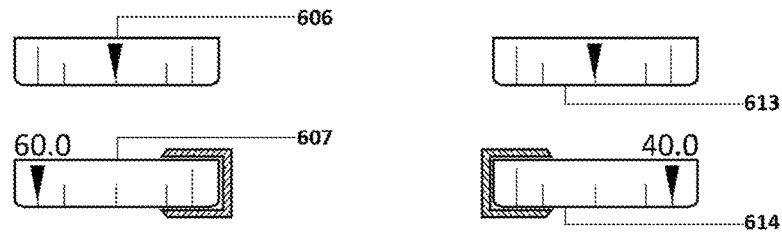
Figure 6:
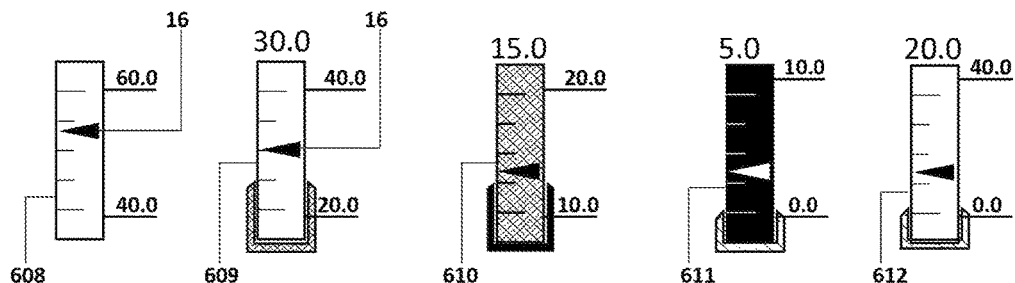
Figure 7:
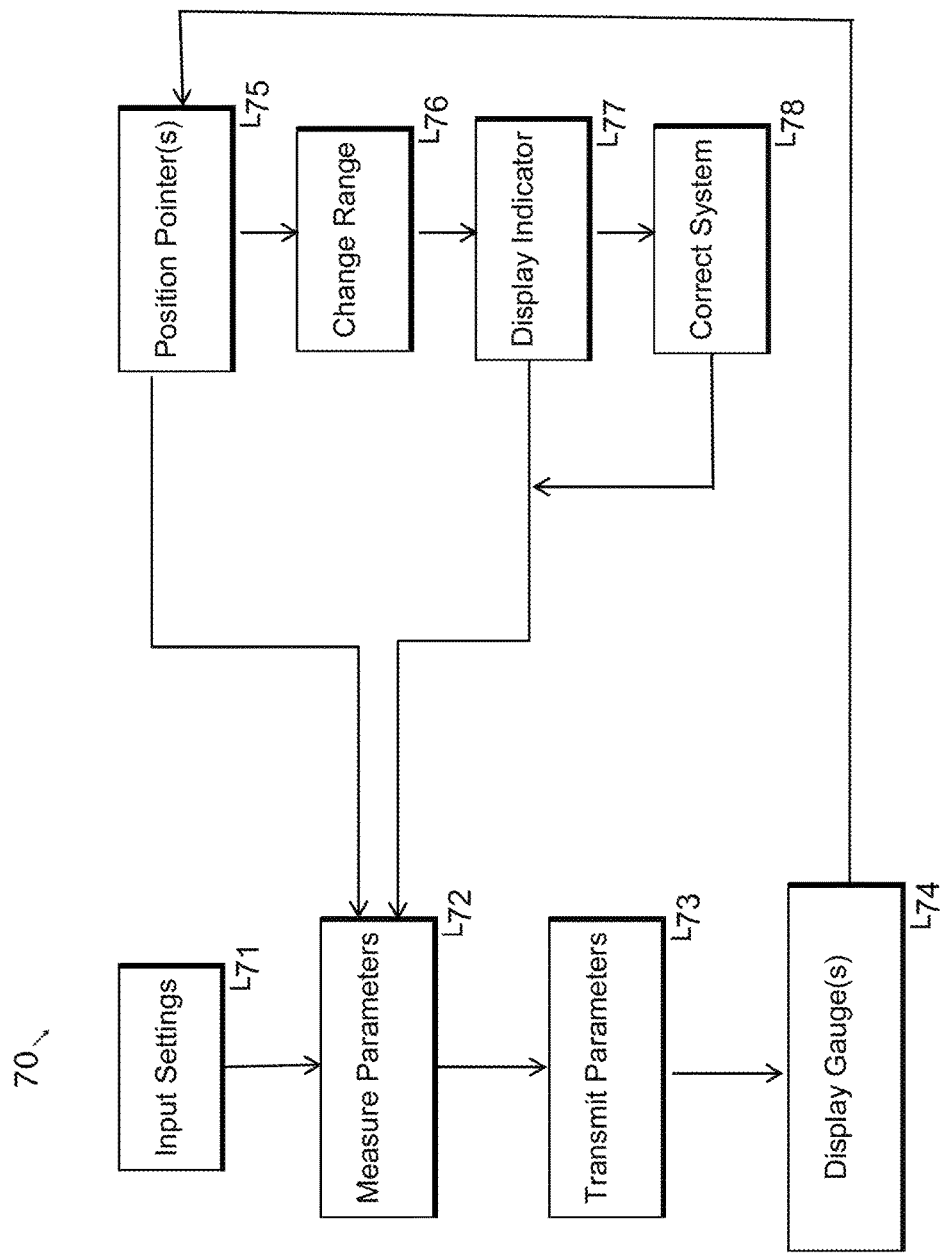
FIG. 7 is a flow chart illustrating an example of a (e.g., computerized) method of communicating potentially abnormal behavior of an industrial system to an operator of the system.

This patent application describes, among other things, examples of certain embodiments, and certain aspects thereof. Other embodiments may differ from the examples described in detail herein. Various embodiments are or concern HMI technology, software, for instance, that communicates behavior of an industrial system to an operator of the system, and methods associated therewith. Various embodiments include computerized systems and methods of, and computer software for, communicating behavior of an industrial system to an operator of the system. FIGS. 1-6 illustrate examples of graphical representations of gauges, for example, representing different parameters of an industrial system. FIG. 7 illustrates method 70, which is an example of a method of communicating (e.g., potentially abnormal) behavior of an industrial system, for instance, to an operator of the industrial system. FIG. 5 illustrates an example of relative operating limits (e.g., 40.0 and 60.0) and alarm values (e.g., 80.0 for high, 90.0 for high high, 20.0 for low, and 10.0 for low low). FIG. 6 includes a similar illustration in the upper left corner.

FIGS. 1-6 illustrate examples of graphical representations or graphical representations of gauges, for instance, having different displayed ranges. Different gauges shown in one or more figures that have the same orientation can be the same gauge or same parameter at different (e.g., real-time) values of the parameter, for example, for example, measured (e.g., in act 72 of FIG. 7) at different times. In some of the embodiments illustrated, the scale of the gauge is gray when the parameter value is within the operating limits, white when the value is outside the operating limits but within the first alarm limits, yellow or purple when the parameter value is outside the first alarm limits but within the second (e.g., high high and low low) alarm limits, red when the value of the parameter is outside the second (e.g., high high and low low) alarm limits, or a combination thereof, as examples.

Figure 2:
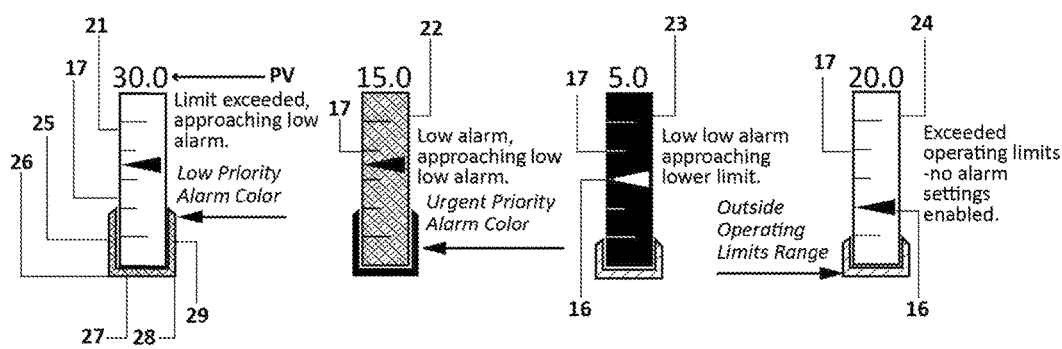
FIG. 2 is an example of a display (e.g., to an operator of an industrial system) of graphical representations of gauges representing one or more different parameters of the industrial system and illustrating low limits of the one or more different parameters.
Figures 3, 4:
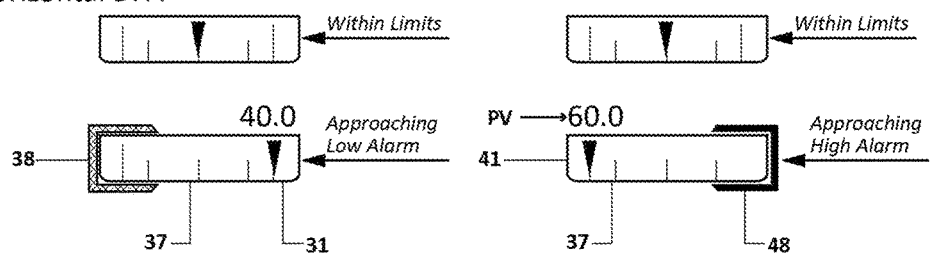
FIG. 3 is an example of a display (e.g., to an operator of an industrial system) of graphical representations of gauges representing one or more different parameters of the industrial system, wherein the graphical representations of gauges are displayed horizontally, and illustrating a parameter is approaching a low alarm.
FIG. 4 is an example of a display (e.g., to an operator of an industrial system) of graphical representations of gauges representing one or more different parameters of the industrial system, wherein the graphical representations of gauges are displayed horizontally, and illustrating a parameter is approaching a high alarm.

In the right-most column in FIGS. 1 and 2 and the second to right-most column in FIG. 6 (i.e., gauges 15, 24, 605, and 612) that show vertical gauges or scales, there are no alarm settings (e.g., input in act 71 of method 70) and the scale (e.g., 17 for gauges 15 and 24) is white when the parameter value is outside the operating limits. In FIG. 6, that has numbers (e.g., range limits of parameter values, for instance, 40.0 and 60.0 for gauge 601) next to the scale, these numbers are not necessarily shown in all embodiments, but are included on FIG. 6 for illustration purposes (e.g., to show the current range for that gauge). In some embodiments, the operator may have the option to display or not display the (e.g., real time) parameter values numerically, which are illustrated being displayed by the larger font numbers below and above the scales in the top and bottom rows respectively for gauges 602-605 and 609-612 in FIG. 6. Gauges 606, 607, 613, and 614 in FIG. 6 illustrate (e.g., visual representations of) examples of horizontal gauges or scales. FIGS. 3 and 4 show further horizontal gauge examples. All gauges illustrated are examples, however, and other embodiments may differ.

In various embodiments, operating limits, alarm limits (e.g., high alarm, low alarm, high high alarm, low low alarm, etc., or a combination thereof), gauge or sensor limits, or a combination thereof, are shown as digital or numerical values (e.g., as a number), for instance, on or adjacent to the scale or indicia. The top and bottom rows of FIG. 6 illustrate examples. In the left gauge in the top row, for example, 60.0 and 40.0 are the operating limits and in the second to left gauge, 60.0 is the upper operating limit and 80.0 is the high alarm limit. In the center gauge, 90.0 is the high high alarm limit and 80.0 is the high alarm limit. In the gauge that is the second from the right, 100.0 is the gauge limit and 90.0 is the high high alarm. In the far right gauge in the top row of FIG. 6, 100.0 is the gauge limit and 60.0 is high operating limit (e.g., in an embodiment that does not include alarm settings or limits). In some embodiments, such digital or numerical values are shown whereas in other embodiments, such digital or numerical values are not shown. In certain embodiments, for example, the operator may be able to select whether such digital or numerical values are shown. Further, in some embodiments, such digital or numerical values are shown under some circumstances but not other circumstances. In various embodiments, such digital or numerical values change, for example, when the range changes (e.g., from a first range to a second range, from the second range to a third range, from the third range to a fourth range, vice versa, or a combination thereof, as examples).

In particular embodiments, for example, no such digital or numerical values are displayed when the parameter value is within the operating limits, but one or more such digital or numerical values are displayed when the parameter value is outside the operating limits. Further, in some embodiments, these digital or numerical values, or the appearance thereof where no such digital or numerical value was previously shown, constitute or are part of a local visual indicator or visual element (e.g., as used herein) that attracts the attention of the operator to the parameter value. In certain embodiments, for instance, an operating range limit is displayed as a digital or numerical value when the parameter value approaches, reaches, or passes that operating limit. Further, in particular embodiments, an alarm limit is displayed as a digital or numerical value when the parameter value approaches, reaches, or passes that alarm limit. Even further, in certain embodiments, a sensor or gauge limit is displayed as a digital or numerical value when the parameter value approaches, reaches, or passes that sensor or gauge limit. In various embodiments, such display of the digital or numerical value alerts the operator of the relevant operating limit, alarm limit, or gauge limit, for example, or a combination thereof. In some embodiments, such a digital or numerical value appears when the displayed range (e.g., of the quantitative parameter) changes from the first range to the second range. Moreover, in particular embodiments, such a digital or numerical value changes (e.g., from an operating limit to an alarm limit or from an alarm limit to a gauge limit) when the displayed range (e.g., of the quantitative parameter) changes from the second range to the third range, from the third range to the fourth range, etc., or a combination thereof. Further, in a number of embodiments, the digital or numerical value changes back or is removed when the displayed range changes in the opposite direction (i.e., toward the operating limits). Further still, in some embodiments, the (e.g., real time) parameter value is displayed, for example, when the digital or numerical value of the limit (e.g., operating limit, alarm limit, gauge limit, or a combination thereof) is displayed, for instance, so the operator can easily compare the parameter value with the relevant limit. Examples include PV in FIGS. 1 and 2.

Method 70, shown in FIG. 7, includes (e.g., using a computer) acts of displaying (e.g., act 74 shown), for instance, to the operator of the (e.g., industrial) system, graphical representations of gauges (e.g., 11, 12, 13, 14, 15, 21, 22, 23, 24, 31, 41, 601, 602, 603, 604, 605, 606, 607, 608, 609, 610, 611, 612, 613, and 614 illustrated in FIGS. 1-6), for example, representing different parameters of the industrial system. Various embodiments, including method 70, change (e.g., in act 76) the displayed range, for instance, of the parameter, for example, when the (e.g., real-time) value of the parameter or parameter value has gone outside of operating limits. FIG. 6, for example, illustrates displayed ranges. For gauge 601, for instance, the displayed range is 40.0 to 60.0 (e.g., the operating limits), for gauge 602, the displayed range is 60.0 to 80.0 (e.g., where 60.0 is the upper operating limit and 80.0 is the high alarm), and for gauge 603, the displayed range is 80.0 to 90.0 (e.g., where 80.0 is the high alarm and 90.0 is the high high alarm).

Further, many embodiments, including method 70, display (e.g., in act 77) a (e.g., local, visual, or both) indicator (e.g., 18 or 19 in FIG. 1), for example, that attracts the operator's attention to a parameter that has gone outside of operating limits. Various embodiments are or provide a tool (e.g., method 70) that can let the operator know where to look for some potential deviations, for instance, in the industrial process. In many embodiments, the "dynamic progressive awareness" tool (e.g., method 70) gives the operator the ability to scan a much larger amount of data (e.g., number of parameters) and (e.g., easily or quickly) identify variables or values that have moved from normal operating limits. In many embodiments, such a tool can efficiently communicate to the operator both normal and abnormal values of various parameters of the industrial system and help the operator to distinguish therebetween.

In a number of embodiments, operating limits (e.g., input in act 71) define narrow bands that have been identified as desirable or optimal bands for operation for different parameters, for instance, of the industrial system. In various embodiments, the operating limits are determined based on safety aspects, product specifications, environmental conditions, economic considerations, efficiencies, or a combination thereof, as examples. In many embodiments, the operating limits define a narrow operating range within a wider alarm range. See, for example, FIG. 5. In the prior art, in normal operations, the operator would scan HMI screens and search for abnormal variables, among other things. In the prior art, however, precise (e.g., real-time) values within operating limits were difficult to read accurately or precise values were not readily available for parameters that were outside of operating limits, among other issues.

Further, many specific embodiments include computerized methods, for example, of communicating potentially abnormal behavior of an industrial system to an operator of the system. Method 70 is an example. Still further, in many embodiments, such a method (e.g., 70) includes an act of (e.g., using a computer) simultaneously displaying (e.g., in act 74), for example, to the operator of the system values of multiple different parameters of the system, for instance, wherein each of the values is a real-time value, each of the multiple different parameters is a quantitative parameter, or both. Further still, where multiple different parameters are described herein, in some embodiments, there may be (e.g., at least) a particular number of parameters, for example, at least 2, 3, 4, 5, 6, 7, 8, 9, 10, 11, 12, 15, 20, 25, 30 40, 50, 60, 70, 80, 100, 125, 150, 200, 250, 300, 400, 500, or more different parameters. In various embodiments, there can be 20-30, 30-50, 50-75, or 50-100 variables or parameters, for example, or more (e.g., displayed in act 74). In some embodiments, for example, a single operator can watch as many as 12 different monitors or screens, for instance, each displaying 30-50 parameters, for example. In different embodiments, a single operator can watch 1, 2, 3, 4, 5, 6, 7, 8, 9, 10, 11, 12, 13, 14, 15, 16, 18, or 20 different monitors or screens, as examples. In some embodiments, an image is projected, for example, onto a wall or projection screen for observation by the operator. In many embodiments, the variables, system values, parameter values, or parameters are physical measurements (e.g., measured parameters), such as pressures, flow rates, temperature, levels (e.g., in tanks), density, concentration, etc. Moreover, as used herein, a real-time value is not necessarily instantaneous, but rather, there may be some lag time that passes between a measurement being taken (e.g., in act 72) and the value being displayed (e.g., in acts 74 and 75). As used herein, unless stated otherwise, a real-time value is the most recent value available or is no more than 10 minutes old. In other embodiments, however, real-time values may be no more than 30, 20, 15, 12, 8, 7, 6, 5, 4, 3, 2, 1, ½, ¼, ⅙, ⅒, ¹/₃₀, or ¹/₆₀ minutes old, as examples. Furthermore, in certain embodiments, parameter values are, or can be, historical values, for example, measured or obtained at a particular time in the past. In a number of embodiments, for example, different historical values were obtained at the same time or within a certain range of times. Such a range of times can be, for example, 1, 2, 3, 5, 7, 10, 15, 20, 30, 45, or 60 minutes (e.g., ago), as examples. In some embodiments, however, parameter values (e.g., measured in act 72) are from different points in time (e.g., some historical and some real-time, or some or all being historical values but from different times in the past).

Even further, various embodiments (e.g., illustrated in FIGS. 1-7) may be used with different industrial processes. Examples include chemical processes, refining (e.g., oil refining), paper making, mining, etc. Some embodiments are limited to particular industrial processes, while other embodiments are applicable to multiple industrial processes. Moreover, various embodiments use (e.g., are run on or implemented by) one or more general purpose computers that include components, systems, and software that are known in the art (e.g., HMI technology). Further, various embodiments are displayed on known or general purpose computer display screens. Selection of appropriate computer hardware, software applications, computer peripherals, computer-readable storage media, etc., is within the skill of a person of ordinary skill in the art. Still further, some embodiments are implemented, in whole or in part, on one or more special purpose computers. Even further, various embodiments, are implemented by software, by hardware, or a combination thereof, as examples. Further still, some embodiments are implemented, in whole or in part, using one or more application specific integrated circuits (ASICs), as another example. Even further still, various embodiments use one or more computer networks. Different embodiments, for example, use a local area network (LAN) a wide area network (WAN), the Internet, or a combination thereof, as examples. In addition, as used herein, "adjacent" unless stated otherwise, when referring to displaying on a computer screen, means within five percent of an overall dimension of the screen. In some embodiments, an alert indicator, or local visual indicator, for example, can be within 1, 2, 3, 4, 6, 7, 8, 9, or 10 percent of an overall dimension of the screen, for instance, of the gauge, scale, or real-time value.

In some embodiments, a parameter value (e.g., a real-time value) is displayed (e.g., in act 74, 75, 76, or 77) as a number, for example, in addition to or instead of being displayed in another manner (e.g., as a reading on graphical representation of a gauge, for instance, in acts 74 and 75). For example, FIG. 1 shows parameter values being displayed as the numbers 70.0, 89.0, 99.5, and 70.0 for gauges 12, 13, 14, and 15 respectively. FIGS. 2-4 and 6 are similar in this regard. In particular embodiments, for example, the real-time value is displayed numerically below a corresponding graphical representation of a gauge (e.g., displayed in act 75), for instance, in FIG. 1 and the top row of FIG. 6. In contrast, in some embodiments, or under certain circumstances, the real-time value is displayed numerically above a corresponding graphical representation of a gauge (e.g., displayed in act 75), for instance, in FIG. 2 and the bottom row of FIG. 6. In particular embodiments, where the value is numerically displayed depends on whether the value is above or below the normally operating limits (e.g., as shown). In various embodiments, the parameter value is displayed as a gauge reading or graphically (e.g., in acts 74 and 75), for instance, in FIGS. 1-6. In some embodiments, the parameter value is displayed (e.g., only) as a gauge (e.g., gauge 11, 601, or 608) when the parameter value is within normal limits (e.g., within the operating limit or limits), but is displayed as a number (e.g., in addition to or instead of being displayed as a gauge) when the parameter value is outside of the normal limits or operating limits (e.g., as shown in FIGS. 1 and 6), as other examples.

Moreover, in various embodiments, a particular parameter value is displayed in a manner that differentiates other parameter values when the particular parameter value is outside of the normal limits or operating limits. Gauges 12-15, 21-24, 31, 41, 602-605, 607, 609-612, and 614 are examples. As other examples, in some embodiments, the parameter value is displayed in a different color, in bold, or in a larger font size, as examples, when the parameter value is outside of the normal limits or operating limits. Still further, in many embodiments, each of the values or gauges is displayed over a schematic diagram of the industrial system, for instance, to help the operator understand the significance of each value or what the value represents within the system. Even further, in some embodiments, each of the values is displayed with (a description or designation of the value, parameter, location, units of measurement, etc.

Various methods (e.g., of communicating potentially abnormal behavior of an industrial system to an operator) can include various acts, which, in different embodiments, can be performed (e.g., using a computer) in various orders. Examples of such orders are illustrated herein (e.g., via method 70 or described herein). Further, in some embodiments, various acts are performed simultaneously. Other specific embodiments include certain computer-readable media, certain computer programs, and certain computer systems that include computer-readable instructions which, when executed by the computer, cause the computer to perform certain (e.g., similar) acts (e.g., some or all of the acts of method 70). Still other embodiments include hardware that is specifically configured (e.g., by software or other than by software) to perform certain (e.g., similar) acts.

In a number of embodiments, such acts include, for example, using a computer, (e.g., simultaneously) displaying to the operator of the industrial system multiple graphical representations (e.g., 11, 12, 13, 14, 15, 21, 22, 23, 24, 31, 41, 601, 602, 603, 604, 605, 606, 607, 608, 609, 610, 611, 612, 613, and 614 illustrated in FIGS. 1-6) representing multiple different parameters of the industrial system. Act 74 shown in FIG. 7 is an example, but other embodiments may differ. In some such, embodiments, each of the multiple different parameters is a quantitative parameter, each of the multiple graphical representations represents a real-time value, each of the multiple graphical representations includes a range representation (e.g., of a displayed range of the parameter, for instance, 10.0 to 20.0 for gauge 610), each of the multiple graphical representations includes a pointer representation (e.g., 16 shown in FIGS. 1, 2, and 6), for example, proximate the scale, each of the multiple graphical representations represents a measured value, or a combination thereof. In various embodiments, each of the multiple graphical representations of the gauges represents a parameter value (e.g., a real-time value or a historical value). Further, in some embodiments, such acts include (e.g., using the computer), for instance, for each of the multiple graphical representations, positioning the pointer representation (e.g., 16, for instance, relative to the range representation or scale) to indicate the parameter value (e.g., real-time value) of the (e.g., quantitative) parameter. In some such embodiments, for example, for each of the multiple graphical representations, when the parameter value is within operating limits, the displayed range of the parameter is a first range that corresponds to the operating limits (e.g., gauges 11, 601, 606, 608, and 613).

Still further, in many embodiments, acts include (e.g., using the computer), for instance, for each of the multiple graphical representations, changing the displayed range of the parameter (e.g., in act 76 shown in FIG. 7) from the first range to a second range, for example, that goes beyond the operating limits. Examples of a second range are shown for gauges 12, 15, 21, 24, 602, 605, 607, 609, 612, and 614. In various embodiments, this act (e.g., 76) of changing the displayed range is performed when the parameter value (e.g., real-time value) of the (e.g., quantitative) parameter has gone outside of the operating limits. Even further, in some embodiments, acts include (e.g., using the computer), for instance, for each of the multiple graphical representations, displaying (e.g., in act 77), for example, to the operator of the industrial system a first local visual indicator (e.g., 18, 19, 38, or 48, in FIGS. 1-4) when the parameter value has gone outside of the operating limits. In various such embodiments, the multiple graphical representations are representations of gauges, for example, as shown. Moreover, in some embodiments the range representation is or includes a bar or scale (e.g., 17 in FIGS. 1 and 2), for instance, represented by a rectangle. Furthermore, in particular embodiments, the pointer representation (e.g., 16) is specifically a pointer, for example, an arrow or an arrow head (e.g., as shown), as examples.

Certain embodiments include (e.g., simultaneously) displaying (e.g., in act 74), for instance, to an operator of an industrial system multiple graphical representations of gauges (e.g., 11, 12, 13, 14, 15, 21, 22, 23, 24, 31, 41, 601, 602, 603, 604, 605, 606, 607, 608, 609, 610, 611, 612, 613, and 614 illustrated in FIGS. 1-6) representing multiple different parameters of the industrial system, wherein: each of the multiple graphical representations of the gauges represents a parameter value (e.g., real-time value), each of the multiple graphical representations of the gauges includes a scale (e.g., 17) representing a displayed range (e.g., shown in FIG. 6) of the parameter, and each of the multiple graphical representations of the gauges includes a pointer (e.g., 16), for example, proximate the scale. Further, some such embodiments include (e.g., for each of the multiple graphical representations of the gauges) positioning the pointer (e.g., relative to the scale, for instance, in act 75) to indicate the parameter value. In many embodiments, (e.g., for each of the multiple graphical representations of the gauges), when the value of the parameter is within operating limits, the displayed range of the parameter is a first range that corresponds to the operating limits (e.g., as illustrated for gauges 11, 601, 606, 608, and 613).

As used herein, a displayed range corresponding to operating limits (i.e., for that range, for example, as shown in FIG. 6, gauges 601, 606, 608, and 613) means that the operating limits are at the ends of the graphical representation of the gauge, to within 25 percent of the length of the gauge. In some embodiments, however, the operating limits are at the ends of the graphical representation of the gauge, to within 30, 20, 15, 10, 5, 2, or 1 percent of the length of the gauge, as other examples. Still further, various such embodiments include, (e.g., for each of the multiple graphical representations of the gauges), changing (e.g., in act 76) the displayed range of the parameter from the first range to a second range (e.g., gauges 12, 15, 602, 605, 607, 609, 612, and 614) that goes beyond the operating limits when the parameter value has gone outside of the operating limits, displaying (e.g., in act 77) to the operator of the industrial system a first local visual indicator when the (e.g., real-time) value of the parameter has gone outside of the operating limits, or both. In various such embodiments, each of the multiple different parameters is a quantitative parameter, for example.

Even further, in particular embodiments, a computer-readable medium, computer program, or computer system, includes computer-readable instructions that, when executed by the computer, cause the computer to (e.g., simultaneously) display (e.g., in act 74) to an operator of an industrial system multiple graphical representations of gauges (e.g., 11, 12, 13, 14, 15, 21, 22, 23, 24, 31, 41, 601, 602, 603, 604, 605, 606, 607, 608, 609, 610, 611, 612, 613, and 614 illustrated in FIGS. 1-6) representing multiple different parameters of the industrial system, position (e.g., in act 75) the pointer (e.g., 16) relative to the scale (e.g., 17) to indicate the value of the parameter, change (e.g., in act 76) the displayed range of the parameter from the first range to a second range that goes beyond the operating limits when the parameter value has gone outside of the operating limits, display (e.g., in act 77) to the operator of the industrial system a first local visual indicator (e.g., 18, 19, 38, or 48) when the parameter value has gone outside of the operating limits, or a combination thereof. In various such embodiments, each of the multiple graphical representations of the gauges represents a real-time value, each of the multiple graphical representations of the gauges includes a scale representing a displayed range of the parameter, each of the multiple graphical representations of the gauges includes a pointer (e.g., 16) proximate the scale, or a combination thereof. FIGS. 1-6 illustrate examples of graphical representations of the gauges. Further, in some such embodiments (e.g., for each of the multiple graphical representations of the gauges), when the parameter value is within operating limits, the displayed range of the parameter is a first range that corresponds to the operating limits. Gauges 11, 601, 606, 608, and 613 are examples.

In some embodiments, the displaying to the operator of the industrial system the first local visual indicator (e.g., in act 77) includes (e.g., simultaneously) displaying (e.g., to the operator of the system) multiple first local visual indicators, for example, for a plurality of the multiple graphical representations of the gauges where the value of the parameter has gone outside of the operating limits. FIGS. 1, 2, and 6 illustrate examples of multiple graphical representations of the gauges. In some embodiments, there can be a greater number of graphical representations of the gauges, for example, each displaying a different parameter of the system. Further, in particular embodiments, the displaying to the operator (e.g., of the industrial system) the first local visual indicator includes changing a color (e.g., proximate the scale), or specifically, in some embodiments, changing the color of the scale (e.g., 17 in FIGS. 1 and 2). As used herein, when referring to a scale, "proximate" means within a distance equal to the largest overall dimension of the scale. In some embodiments, however, the color can be within a distance equal to twice, half of, a quarter of, an eighth of, or a sixteenth of the largest overall dimension of the scale (e.g., 17), as other examples.

Still further, in some embodiments, the displaying (e.g., in act 77) to the operator of the industrial system the first local visual indicator includes adding a visual element (e.g., 18, 19, 38, or 48 shown in FIGS. 1-4) to the scale. In particular embodiments, for example, the visual element is an outline of all or part of the scale. In the embodiment shown, for example, the visual element (e.g., 18, 19, 38, or 48) is an outline of part of the scale (e.g., 17 or 37). Even further, in some embodiments, the outline circumscribes all or part of the scale, the outline forms a border around all or part (e.g., one end) of the scale, or both. FIGS. 1-6 illustrate an example where visual elements 18, 19, 38, and 48 outline, circumscribe, and form a border around part of the scale (e.g., 17 or 37). Further still, in certain embodiments, the visual element is located at a first end of the scale (e.g., the top of the scale or the right end of the scale, for instance, as shown in FIGS. 1 and 4 respectively and the top row of FIG. 6 and gauge 607) when the (e.g., real-time) value of the (e.g., quantitative) parameter exceeds the operating limits (e.g., input in act 71). Even further, in some embodiments, the visual element is located at a second end of the scale (e.g., the bottom of the scale or the left end of the scale, for instance, as shown in FIGS. 2 and 3 and the bottom row if FIG. 6 and gauge 614) when the value of the parameter is below the operating limits. In a number of embodiments, the location of the visual element indicates (e.g., to the operator) whether the parameter value is above or below the operating limits (e.g., input in act 71). In some embodiments, for example, the visual element is a cap on (e.g., an end of) the scale, at the top of the scale (e.g., as shown in FIG. 1), at the bottom of the scale (e.g., as shown in FIG. 2), or on one of the sides of the scale (e.g., as shown in FIGS. 3 and 4). In a number of embodiments, when a parameter is approaching an alarm condition, the appropriate end of the gauge or scale is capped with that alarm color, for example. In particular embodiments, for instance, the visual element includes three elongated sections (e.g., 25, 27, and 29 shown for gauge 21 in FIG. 2), for example, separated by two angles (e.g., 26 and 28). In certain embodiments, the two angles (e.g., 26 and 28) are right angles, for example (e.g., as shown). Further, in various embodiments, the three elongated sections (e.g., 25, 27, and 29) are equal in width. Still further, in some embodiments, two (e.g., 25 and 29) of the three elongated sections (e.g., 25, 27, and 29) are equal in length. In particular embodiments, for example, these two equal-length sections (e.g., 25 and 29) are parallel (e.g., as shown). In other embodiments, however, visual elements may differ.

Even further, in some embodiments, the color of the visual element (e.g., in addition to or instead of the location) indicates to the operator whether the parameter value is above or below the operating limits. For instance, in particular embodiments, the visual element (e.g., 18, 19, 38, or 48) is yellow when the value of the parameter is above the operating limits and the visual element is purple when the parameter value is below the operating limits. In certain embodiments, for example, these colors are displayed (e.g., in act 77) when or only when the parameter value is within the alarm settings or within the second range. In some embodiments, for example, the color of the visual element changes (e.g., in act 77) to red when (or only when) the (e.g., real-time) value of the parameter is beyond the (e.g., first) alarm settings or within the third range, for example. In some embodiments, the color of the visual element changes to red or remains red when the value of the parameter is beyond the (e.g., second) alarm settings or within the fourth range, for a further example. In other embodiments, different colors or color combinations are used. For example, in some embodiments, orange may be used instead of yellow or instead of red or one such color may indicate that the value of the parameter is above an alarm setting and another such color (or other color) may indicate that the value of the parameter is below an alarm setting. For another example, in some embodiments, magenta may be used (e.g., instead of red). In different embodiments, different colors can be used. All conceivable colors are contemplated, and all conceivable color combinations. In a number of embodiments, however, different colors that are contrasting or easily distinguishable are used so the different conditions relative to the operating limits or alarm limits are readily apparent to the operator and easily noticeable. Examples are described herein, but other embodiments may differ.

In many embodiments, the gauge (e.g., graphical representation thereof) or scale includes multiple indicia. Indicia 101 and 102 are identified, for example, on gauge 15 shown in FIG. 1, having scale 17. Other gauges that are shown are similar. In particular embodiments, for instance, the multiple indicia include multiple (e.g., evenly-spaced) lines (e.g., as shown). In certain embodiments, for example, the multiple lines include multiple shorter lines (e.g., 102) and multiple longer lines (e.g., 101). Further, in various embodiments, the multiple evenly-spaced lines are parallel (e.g., as shown). Still further, in certain embodiments, the multiple indicia include multiple numerical values of the (e.g., quantitative) parameter, for instance, within the displayed range. Even further, in some embodiments, the pointer (e.g., 16, identified for a few of the gauges in FIGS. 1, 2, and 6) includes a triangle, for example, an isosceles triangle (e.g., pointer 16). For instance, in particular embodiments, the pointer consists exclusively of an isosceles triangle (e.g., as shown). Even further still, in a number of embodiments, the act of changing the displayed range of the parameter from the first range to a second range (e.g., act 76) includes moving the pointer (e.g., 16), for example, relative to the scale (e.g., 17).

In various embodiments, the second range (e.g., changed to in act 76) has a first end (e.g., bottom end for gauge 602 shown in FIG. 6) and a second end (e.g., top end for gauge 602) and the first end is one of the operating limits, the second end is an alarm value of the (e.g., quantitative) parameter, or both (e.g., as shown for gauge 602). As used herein, an end of a range being an operating limit or an alarm value means that the operating limit or alarm value is at the end of the range (e.g., of the graphical representation of the gauge), to within 25 percent of the length of the range (e.g., gauge). In some embodiments, however, the operating limit or an alarm value is at the end of the range or graphical representation of the gauge, to within 30, 20, 15, 10, 5, 2, or 1 percent of the length of the range or gauge, as other examples. In various embodiments, the operating limits, alarm values, or both, are settings that are input, for example, in act 71.

Further, a number of embodiments include (e.g., using the computer), for instance, for a plurality of the multiple graphical representations of the gauges, changing (e.g., in act 76) the displayed range of the parameter from the second range to a third range, for example, that goes beyond the second range. In some embodiments, this change to the third range is made, for example, when the value of the (e.g., quantitative) parameter (e.g., measured in act 72, transmitted in act 73, or both) has gone outside of the second range. In particular embodiments, the third range has a first end and a second end and the first end is an alarm value (e.g., a first alarm value) of the parameter. Still further, in certain embodiments, the second end is a second alarm value (e.g., a high high alarm value or a low low alarm value, for instance, input in act 71), for instance, of the parameter. Gauge 603 illustrates an example.

Even further, some embodiments include (e.g., using the computer), for example, for a plurality of the multiple graphical representations of the gauges (e.g., shown in FIGS. 1-6), displaying (e.g., in act 77) to the operator (e.g., of the industrial system) a second local visual indicator when the (e.g., real-time) value of the (e.g., quantitative) parameter has gone outside of the second range. In particular embodiments, for example, the displaying to the operator of the industrial system the second local visual indicator includes changing a color (e.g., proximate to the scale), for instance, changing the color of the scale (e.g., 17 or 37). In various embodiments, the visual element (e.g., 18, 19, 38, or 48) continues to be displayed when the parameter value has gone outside of the second range. In some embodiments, however, the visual element changes appearance when the parameter value has gone outside of the second range, for example, in color, size or thickness. In some embodiments, the same can be true of other ranges described herein (e.g., the third range or the fourth range).

In some embodiments, the shape of (e.g., all or part of) the local visual indicator or visual element changes when the displayed range changes, for example. In the embodiment shown, for instance, in FIGS. 1 and 2, elongated sections 25 and 29 in FIG. 2 become shorter in visual element 19 shown in FIG. 1 than visual element 18. In this particular embodiment, the shape of the visual element changes to indicate to the operator that the cap represents the upper limit of the gauge or sensor (e.g., rather than indicating an operating limit or alarm value for situational awareness). The top and bottom rows in FIG. 6 are similar. In different embodiments, the shape of the visual element changes between the first range and the second range, between the second range and the third range, between the third range and the fourth range, or a combination thereof, as examples. The same may be true (e.g., in addition or instead) between other ranges in embodiments that have other (e.g., more than four) ranges. Change in length (e.g., shortening) of elongated sections (e.g., 25, 29, or both) of end caps (e.g., shown in FIGS. 1, 2, and 6) is an example of a change in shape, but other embodiments may have other changes.

Some embodiments include, (e.g., using the computer), for example, for a plurality of the multiple graphical representations of the gauges (e.g., shown in FIGS. 1-6), changing (e.g., in act 76 shown in FIG. 7) the displayed range (e.g., shown in FIG. 6) of the (e.g., quantitative) parameter to a fourth range, for instance, that goes beyond the second range, for example, when the parameter value (e.g., measured in act 72) is outside of the second range. In particular embodiments, for example, the act (e.g., 76) of changing the displayed range of the (e.g., quantitative) parameter to the fourth range includes changing the displayed range of the parameter from the third range to the fourth range, for instance, when the value of the parameter has gone outside of the third range. In a number of such embodiments, for example, the fourth range goes beyond the third range. Gauge 604 in FIG. 6 illustrates an example.

Further, in various embodiments, the fourth range has a first end and a second end. In some such embodiments, for example, the first end of the fourth range is a high high alarm value or a low low alarm value of the parameter. Moreover, in some embodiments, the second end of the fourth range is a limit of the instrument range for the parameter (e.g., measured in act 72). Gauge 604 illustrates an example. In this context, the instrument range is the range of the particular sensor, transducer, or instrument that is used to measure the particular parameter. In some embodiments, for example, the instrument range is input in act 71 of method 70. Certain embodiments include (e.g., using the computer), for instance, for a plurality of the multiple graphical representations of the gauges, displaying (e.g., in act 77) to the operator of the industrial system a third local visual indicator when the real-time value of the (e.g., quantitative) parameter has gone outside of the third range. In particular, in some embodiments, the displaying to the operator of the industrial system the third local visual indicator includes changing a color (e.g., proximate to the scale), for example, changing the color of the scale (e.g., 17).

As described, certain embodiments include four ranges, for example, the first range (e.g., gauge 601), the second range (e.g., gauge 602), the third range (e.g., gauge 603), and the fourth range (e.g., gauge 604), as described herein. Other embodiments, however, can have a different number of ranges, for example, 2, 3, 5, 6, 7, 8, 9, 10, 12, 15, or 20 ranges, as examples. Various embodiments include more than one range, more than two ranges, more than three ranges, more than four ranges, or more than five ranges, as examples. In certain embodiments having five ranges, for example, the second end is a second alarm value (e.g., a high high high alarm value or a low low low alarm value), for instance, of the parameter. Further, in some embodiments having two ranges, for example, the second range has a first end and a second end and the second end is a limit of instrument range for the (e.g., quantitative) parameter.

In some embodiments, the color (e.g., of the graphical representation, scale (e.g., 17), or proximate the scale), is gray when the parameter is within operating limits (e.g., input in act 71). In some embodiments, the color changes (e.g., in act 77) to white when the parameter moves outside of the operating limits but remains within the alarm limits (in some embodiments, the second range). Further, in some embodiments, the color changes to yellow when the parameter reaches the high alarm or low alarm (e.g., input in act 71) but remains between the high high alarm and the low low alarm settings (in some embodiments, the third range). Still further, in some embodiments, the color (e.g., of scale 17) changes to purple when the parameter reaches the high alarm or low alarm but remains between the high high alarm and the low low alarm setting (in some embodiments, the third range). Even further, in some embodiments, the color changes (e.g., in act 77) to yellow when the parameter (e.g., measured in act 72) reaches the high alarm and the color changes to purple when the parameter reaches the low alarm, but remains between the high high alarm and the low low alarm settings (in some embodiments, the third range). In such embodiments, the color indicates whether the parameter value (e.g., transmitted in act 73) is above or below the operating limits. Further still, in some embodiments, the color changes to red when the parameter reaches the high high alarm or low low alarm (in some embodiments, the fourth range, for example, input in act 71).

In a number of embodiments, the displaying to the operator of the industrial system the first local visual indicator (e.g., in act 77) includes changing the color (e.g., proximate to or of the scale, for instance, 17) from gray. Further, in various embodiments, the displaying to the operator of the industrial system the first (e.g., local visual) indicator includes changing the color to white. Still further, in some embodiments, the displaying to the operator of the industrial system the second local visual indicator includes changing the color from white. Further still, in a number of embodiments, the displaying to the operator of the industrial system the second local visual indicator includes changing the color (e.g., in act 77) to yellow. Even further, in some embodiments, the displaying to the operator of the industrial system the third local visual indicator includes changing the color from yellow. Even further still, in various embodiments, the displaying to the operator of the industrial system the third local visual indicator includes changing the color to red. In other embodiments, however, one or more different colors can be used (e.g., purple instead of yellow).

Additionally, in a number of embodiments, the act (e.g., 75) of positioning the pointer (e.g., 16) relative to the scale (e.g., 17) to indicate the (e.g., real-time) value of the (e.g., quantitative) parameter (e.g., measured in act 72) includes moving the pointer vertically, for example, relative to the scale. FIGS. 1 and 2 are examples as are gauges 601-605 and 608-612 in FIG. 6. On the other hand, in some embodiments, the act of positioning (e.g., in act 75) the pointer relative to the scale to indicate the parameter value includes moving the pointer horizontally, for instance, relative to the scale. FIGS. 3 and 4 and gauges 606, 607, 613, and 614 in FIG. 6 illustrate examples. In many embodiments, the movement of the pointer (e.g., 16) is pure translation, for example, vertical or horizontal (e.g., as shown). In other embodiments, however, the pointer can rotate (e.g., exclusively or in combination with translation). In certain embodiments, for instance, the graphical representation of the gauge or the scale can be round and the pointer can rotate without translating. In other embodiments, the graphical representation of the gauge or the scale can be curved and the pointer can rotate and translate, for example, remaining perpendicular to the curved scale. Further, in various embodiments, the pointer points to the scale, is superimposed over the scale (e.g., as shown), or both.

In many embodiments, the displaying to the operator of the industrial system the multiple graphical representations of gauges representing multiple different parameters of the industrial system (e.g., act 74 in FIG. 7) includes displaying the multiple graphical representations of gauges on a computer screen. In some embodiments, multiple computer screens are used. Further, in some embodiments, the multiple graphical representations of gauges are displayed over a schematic diagram of the industrial system. Still further, in many embodiments, the gauges are lined up on the computer screen so that the operator can look down a row of gauges to see the (e.g., real-time) values of the different parameters quickly and efficiently, for example, relative to the operating limits, alarm settings, or both. Graphical representations of gauges are shown lined up in FIGS. 1, 2, and 6, for example.

In many embodiments, the operator can input the operating limits, alarm settings, or both (e.g., in act 71). Various embodiments include an act of (e.g., using the computer) prompting (e.g., in act 71) the operator to input the operating limits (e.g., established for the parameters, for instance, as actual values). Further, some embodiments include an act of (e.g., using the computer) inputting (e.g., in act 71) from the operator the operating limits. Similarly, some embodiments include an act of (e.g., using the computer), prompting (e.g., in act 71) the operator to input the alarm value of the (e.g., quantitative) parameter. Still further, some embodiments include an act of (e.g., using the computer), inputting (e.g., in act 71) from the operator the alarm value of the parameter. In some embodiments, first and second alarm values can be input (e.g., in act 71). Moreover, in a number of embodiments, operating limits, alarm values, or both, may be input (e.g., in act 71) once and then only adjusted occasionally (e.g., in act 71), for example, when other operating limits, alarm values, or both are identified.

In many embodiments, the method (e.g., 70) includes an act of (e.g., using the computer), prompting (e.g., the operator) to input the operating limit established for the parameter (e.g., measured in act 72). In some embodiments, for example, the method includes (e.g., using the computer) inputting (e.g., from the operator) an operating limit (e.g., established for the parameter), that is input (e.g., in act 71) as an actual value of the parameter. For instance, where the parameter is pressure, the operating limit may be input (e.g., in act 71) in pounds per square inch, pascals, or atmospheres, as examples, or where the parameter is temperature, the operating limit may be input in degrees (e.g., F, K, or C), for example. Further, some embodiments include an act of (e.g., using the computer) prompting (e.g., the operator) to select (e.g., in act 71) the operating limit established for the parameter from multiple discrete alternatives. Even further, various embodiments include an act of (e.g., using the computer) inputting (e.g., from the operator) the operating limit established for the parameter.

Moreover, certain embodiments include an act of (e.g., using the computer) prompting (e.g., the operator) to input the upper operating limit established for the parameter, an act of (e.g., using the computer) inputting (e.g., from the operator) the upper operating limit established for the parameter, or both (e.g., in act 71). Similarly, certain embodiments include an act of (e.g., using the computer) prompting (e.g., the operator) to input the lower operating limit established for the parameter, an act of (e.g., using the computer) inputting from the operator the lower operating limit established for the parameter, or both (e.g., in act 71). Still further, particular embodiments, include an act of (e.g., using the computer) prompting (e.g., the operator) to input an operating limit percentage for the upper operating limit established for the parameter, an act of (e.g., using the computer) calculating (e.g., in act 71) the upper operating limit established for the parameter, for example, using the operating limit percentage, or both. Similarly, certain embodiments include an act of (e.g., using the computer) prompting (e.g., the operator) to input an operating limit percentage for the lower operating limit established for the parameter, an act of (e.g., using the computer) calculating the lower operating limit established for the parameter, for instance, using the operating limit percentage, or both (e.g., in act 71). In some embodiments, the operator, for instance, can input one operating limit percentage for both the upper and lower limits, as another example. Further, in some embodiments, the operator, for instance, can adjust the operating limit or limits of multiple or all of the values at once, for example, by adjusting the operating limit percentage (e.g., in act 71). Moreover, in some embodiments, the operator, for instance, can set (e.g., in act 71) some, multiple, or all current (e.g., real-time) values or parameter values at the center of the operating limits, for example, when the plant or industrial process is operating well, thus defining the normal operating values from which the operating limits are calculated (e.g., using the operating limit percentage).

Even further, various embodiments include (e.g., simultaneously) measuring (e.g., in act 72 of method 70) the multiple different parameters of the industrial system, transmitting (e.g., in act 73) the multiple different parameters of the (e.g., industrial) system (e.g., to the computer), for instance, for displaying (e.g., in act 74) to the operator of the system the multiple graphical representations of the gauges representing the multiple different parameters of the industrial system, or a combination thereof. For example, the multiple different parameters of the industrial system may be measured (e.g., in act 72) using various sensors, transducers, or the like, for example, that are known in the art. Further, transmitting (e.g., in act 73) the multiple different parameters of the industrial system (e.g., to the computer) for displaying to the operator of the system may be accomplished with hard wiring, through wireless communication, or both. In some embodiments, different sensors, transducers, etc., may include dedicated wiring, while in other embodiments, multiplexing may be used. In some embodiments, a computer network may be used.

Moreover, a number of embodiments include an act (e.g., 78 shown in FIG. 7) of correcting the (e.g., industrial) system, for example, correcting abnormal or potentially-abnormal behavior of the industrial system. In some embodiments, for example, an act of correcting potentially-abnormal behavior of the industrial system includes (e.g., in act 78) adjusting at least one flow rate in the industrial system, adjusting at least one level (e.g., a liquid level in a tank) in the industrial system, adjusting at least one pressure in the industrial system, adjusting a control scheme in the industrial system, or a combination thereof, as examples. Further, in various embodiments, the multiple different parameters (e.g., measured in act 72, transmitted in act 73, or both) comprise at least ten, at least twenty, at least thirty, at least forty, or at least fifty different parameters, as examples. In some embodiments, an act (e.g., in act 78) of correcting the potentially-abnormal behavior of the industrial system may be done using the computer, but in other embodiments, certain corrective action may be performed by the operator, for example, without using the computer specifically to implement the corrective action. In different embodiments, or for different corrective actions, corrective actions can be computer implemented or otherwise.

Other embodiments include an apparatus or various methods of obtaining or providing an apparatus or information, for instance, that include a novel combination of the features described herein. Even further embodiments include at least one means for accomplishing at least one functional aspect described herein. The subject matter described herein includes various means for accomplishing the various functions or acts described herein or that are apparent from the structure and acts described. Each function described herein is also contemplated as a means for accomplishing that function, or where appropriate, as a step for accomplishing that function. Moreover, various embodiments include certain (e.g., combinations of) aspects described herein. All novel combinations are potential embodiments. Some embodiments may include a subset of elements described herein and various embodiments include additional elements as well.

Further, various embodiments of the subject matter described herein include various combinations of the acts, structure, components, and features described herein, shown in the drawings, described in any documents that are incorporated by reference herein, or that are known in the art. Moreover, certain procedures can include acts such as manufacturing, obtaining, or providing components that perform functions described herein or in the documents that are incorporated by reference. Further, as used herein, the word "or", except where indicated otherwise, does not imply that the alternatives listed are mutually exclusive. Even further, where alternatives are listed herein, it should be understood that in some embodiments, fewer alternatives may be available, or in particular embodiments, just one alternative may be available, as examples.

What is claimed is:

1. A computerized method of communicating potentially abnormal behavior of an industrial system to an operator of the industrial system, the method comprising acts of:
   simultaneously measuring multiple different parameters of the industrial system;
   transmitting the multiple different parameters of the industrial system to a computer;
   using the computer, simultaneously displaying to the operator of the industrial system multiple graphical representations of gauges representing the multiple different parameters of the industrial system;
   wherein:
      each of the multiple different parameters is a quantitative parameter;
      each of the multiple graphical representations of the gauges represents a parameter value;
      each of the multiple graphical representations of the gauges comprises a scale representing a displayed range of the quantitative parameter; and
      each of the multiple graphical representations of the gauges comprises a pointer proximate the scale;
   using the computer, for each of the multiple graphical representations of the gauges, positioning the pointer relative to the scale to indicate the parameter value, wherein:
      for each of the multiple graphical representations of the gauges, when the parameter value is within operating limits of the quantitative parameter, the displayed range of the quantitative parameter is a first range that corresponds to the operating limits;
   using the computer, for each of the multiple graphical representations of the gauges, changing the displayed range of the quantitative parameter from the first range to a second range that goes beyond the operating limits when the parameter value has gone outside of the operating limits; and
   using the computer, for each of the multiple graphical representations of the gauges, displaying to the operator of the industrial system a first local visual indicator when the parameter value has gone outside of the operating limits wherein:
      the displaying to the operator of the industrial system the first local visual indicator comprises adding a visual element to the scale;
      the visual element comprises an outline of the scale; and
      the outline forms a border around one end of the scale.

2. The method of claim 1 wherein the displaying to the operator of the industrial system the first local visual indicator comprises changing a color of the scale.

3. The method of claim 1 wherein:
the visual element is located at a first end of the scale when the parameter value exceeds the operating limits; and
the visual element is located at a second end of the scale when the parameter value is below the operating limits.

4. The method of claim 1 wherein:
the second range has a first end and a second end;
the first end is one of the operating limits; and
the second end is an alarm value of the quantitative parameter.

5. The method of claim 1 further comprising, using the computer, for a plurality of the multiple graphical representations of the gauges, changing the displayed range of the quantitative parameter from the second range to a third range that goes beyond the second range when the parameter value has gone outside of the second range.

6. The method of claim 5 wherein:
the third range has a first end and a second end;
the first end is an alarm value of the quantitative parameter; and
the second end is a high high alarm value or a low low alarm value of the quantitative parameter.

7. The method of claim 5 further comprising, using the computer, for a plurality of the multiple graphical representations of the gauges, displaying to the operator of the industrial system a second local visual indicator when the parameter value has gone outside of the second range.

8. The method of claim 7 wherein the displaying to the operator of the industrial system the second local visual indicator comprises changing a color of the scale.

9. The method of claim 5 further comprising, using the computer, for a plurality of the multiple graphical representations of the gauges, changing the displayed range of the quantitative parameter to a fourth range that goes beyond the third range when the parameter value is outside of the third range wherein the fourth range goes beyond the third range.

10. The method of claim 9 wherein the fourth range has a first end and a second end and the first end is a high high alarm value or a low low alarm value of the quantitative parameter.

11. The method of claim 9 wherein the fourth range has a first end and a second end and the second end is a limit of instrument range for the quantitative parameter.

12. The method of claim 9 further comprising, using the computer, for a plurality of the multiple graphical representations of the gauges, displaying to the operator of the industrial system a third local visual indicator when the parameter value has gone outside of the third range.

13. The method of claim 1 wherein:
the displaying to the operator of the industrial system the multiple graphical representations of gauges representing multiple different parameters of the industrial system comprises displaying the multiple graphical representations of gauges on a computer screen; and
the multiple graphical representations of gauges are displayed over a schematic diagram of the industrial system.

14. The method of claim 1 further comprising an act of:
correcting the potentially abnormal behavior of the industrial system.

15. A computer system comprising computer-readable instructions which, when executed by the computer system, cause the computer system to:
simultaneously display to an operator of an industrial system multiple graphical representations of gauges representing multiple different parameters of the industrial system, wherein:
each of the multiple different parameters of the industrial system has been measured;
each of the multiple different parameters of the industrial system has been transmitted to the computer system for displaying to the operator of the industrial system the multiple graphical representations of the gauges representing the multiple different parameters of the industrial system;
each of the multiple graphical representations of the gauges represents a parameter value;
each of the multiple graphical representations of the gauges comprises a scale representing a displayed range of the parameter; and
each of the multiple graphical representations of the gauges comprises a pointer proximate the scale;
for each of the multiple graphical representations of the gauges, position the pointer relative to the scale to indicate the parameter value, wherein: for each of the multiple graphical representations of the gauges, when the parameter value is within operating limits, the displayed range of the parameter is a first range that corresponds to the operating limits;
for each of the multiple graphical representations of the gauges, change the displayed range of the parameter from the first range to a second range that goes beyond the operating limits when the parameter value has gone outside of the operating limits; and
for each of the multiple graphical representations of the gauges, display to the operator of the industrial system a first local visual indicator when the parameter value has gone outside of the operating limits wherein: the first local visual indicator comprises an outline of the scale and the outline of the scale forms a border around one end of the scale.

16. A computerized method of communicating potentially abnormal behavior of an industrial system to an operator of the industrial system, the method comprising acts of:
measuring multiple different parameters of the industrial system;
transmitting the multiple different parameters of the industrial system to a computer for displaying to the operator of the industrial system multiple graphical representations of gauges representing the multiple different parameters of the industrial system;
using the computer, simultaneously displaying to the operator of the industrial system the multiple graphical representations of the gauges representing the multiple different parameters of the industrial system, wherein:
each of the multiple different parameters is a quantitative parameter;
each of the multiple graphical representations of the gauges represents a parameter value;
each of the multiple graphical representations of the gauges comprises a scale including a range representation of a displayed range of the quantitative parameter; and
each of the multiple graphical representations of the gauges comprises a pointer representation proximate the range representation;
using the computer, for each of the multiple graphical representations of the gauges, positioning the pointer representation relative to the range representation to indicate the parameter value, wherein:

for each of the multiple graphical representations of the gauges, when the parameter value is within operating limits, the displayed range of the quantitative parameter is a first range that corresponds to the operating limits; and using the computer, for each of the multiple graphical representations of the gauges, changing the displayed range of the quantitative parameter from the first range to a second range that goes beyond the operating limits when the parameter value has gone outside of the operating limits; and using the computer, for each of the multiple graphical representations of the gauges, displaying to the operator of the industrial system a first local visual indicator when the parameter value has gone outside of the operating limits, wherein:

the displaying to the operator of the industrial system the first local visual indicator comprises adding a visual element to the scale;

the visual element is an outline of the scale; and the outline forms a border around one end of the scale.

17. The method of claim 16 further comprising an act of:
correcting the potentially abnormal behavior of the industrial system.

* * * * *